No. 657,628. Patented Sept. 11, 1900.
J. E. TURNEY.
FILTER PRESS PLATE.
(Application filed Mar. 16, 1900.)
(No Model.)
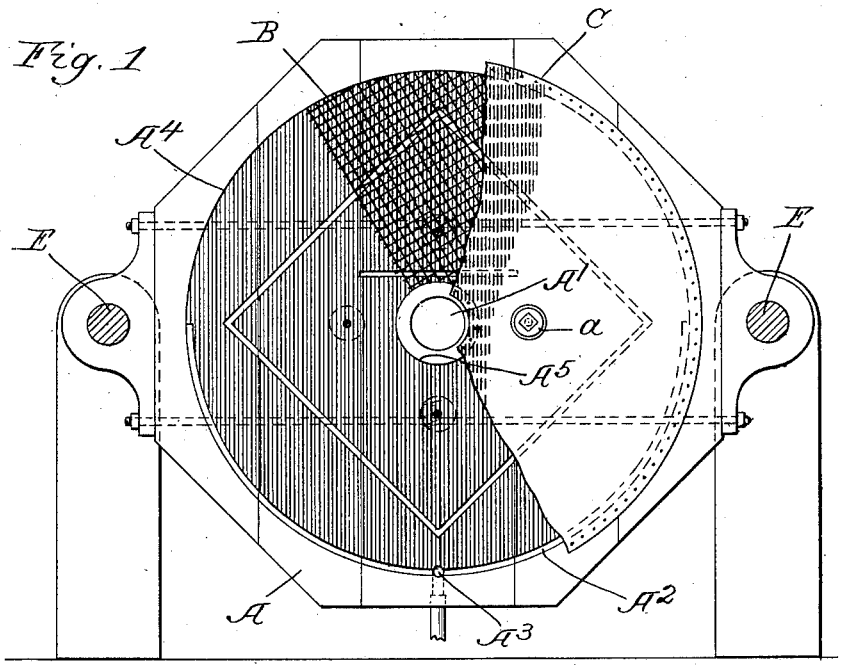
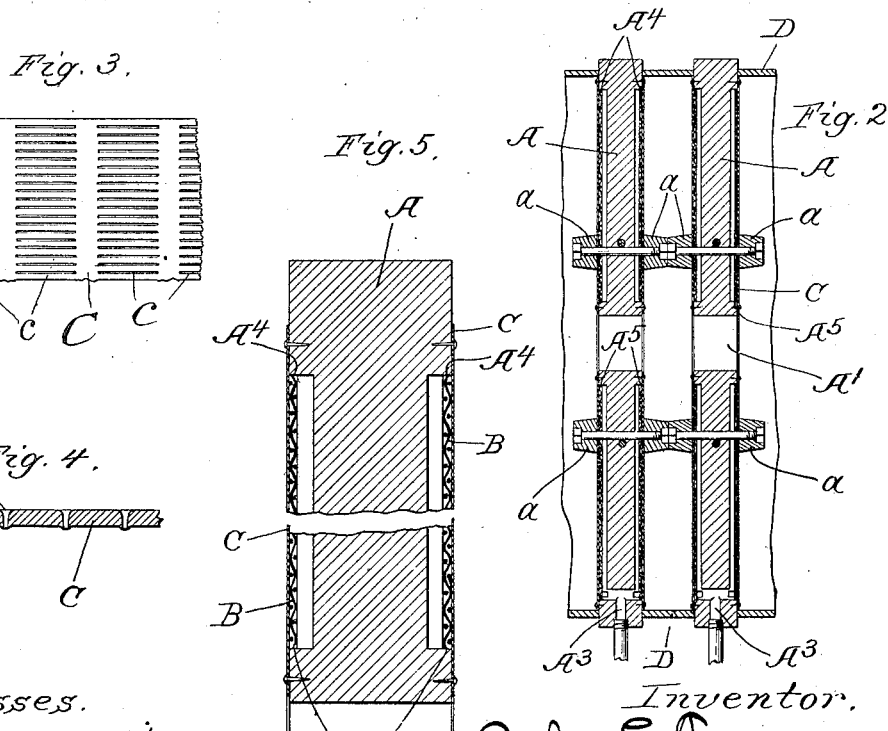
Witnesses.
Edward T. Wray.
Adna H. Bourn Jr.
Inventor.
John E. Turney
by Burton & Burton
his Att'ys

UNITED STATES PATENT OFFICE.

JOHN E. TURNEY, OF LOUISVILLE, KENTUCKY, ASSIGNOR TO THE TURNEY DRIER COMPANY, OF CHICAGO, ILLINOIS.

FILTER-PRESS PLATE.

SPECIFICATION forming part of Letters Patent No. 657,628, dated September 11, 1900.

Application filed March 16, 1900. Serial No. 8,889. (No model.)

*To all whom it may concern:*

Be it known that I, JOHN E. TURNEY, a subject of the Queen of Great Britain, residing at Louisville, county of Jefferson, State of Kentucky, have invented certain new and useful Improvements in Filter-Press Plates, of which the following is a specification, reference being had to the accompanying drawings, forming a part thereof.

In the drawings, Figure 1 is an elevation of my improved filter-press plate having the outer covering broken away at a part of its extent to disclose the supporting wire screen and the latter also broken away at a part of its extent to disclose the grooved plate upon which it rests. Fig. 2 is a diametric section of a portion of a filter-press having my improved plate, showing its relation to the remainder of the cell. Fig. 3 is an enlarged detail plan of a piece of the outer filtering element of perforated sheet metal. Fig. 4 is a many-times-magnified detail section of a piece of the sheet metal shown in Fig. 3. Fig. 5 is a detail section, about full size, through the assembled filter-plate at the grooves of the central element.

My present invention relates to plates for filter-presses of the general character in which heretofore the surface or immediate filtering element of the plate has been some sort of textile fabric, canvas, or the like, such fabric being supported or backed by a plate or skeleton of some sort having grooves or other surface recesses into which the liquid forced by pressure through the outer filtering element passes and by which it is conducted to a drainage-channel, and thus passes out of the cell, of which the plate is one wall, leaving behind solid matter filling the cell. My improvement relates to the character of this outer or filtering element of the plate. The canvas which has heretofore been applied rapidly wears out under the severe pressure which it is desirable to employ in the use of such presses to filter certain classes of material, and the cost of frequent renewals of the canvas covering of the plates is therefore a large element in the cost of operating the presses. I have found by experiment that perforated sheet metal may be used for the outer or surface covering of such plate and as the immediate filtering element with as great efficiency, so far as the perfection of the filtering performed, as the closest-woven textile fabric, and with greater efficiency with respect to the amount of filtration that can be effected through such plate as compared with the fabric, and with still greater economy growing out of the durability of the perforated sheet metal as compared with the canvas or other textile fabric.

My improved plate comprises the central or backing element A, which is preferably a plank grooved up and down upon both surfaces, (except when it is the outer wall of the end cell of the press, in which case only one surface is grooved,) the grooves being connected around the lower edge or margin of the plate by a cross-channel $A^2$, which leads to a discharge-duct $A^3$, by which the liquid is conducted out of the press. The grooved area of the plate A is encompassed by a shoulder $A^4$ and within such shoulder the open-meshed wire screen B is lodged upon such grooved surface, the wires of the screen being preferably placed oblique to the filter-grooves. The height of the shoulder $A^4$ is sufficient only to accommodate the thickness of the open-meshed screen B, and upon the latter I place the perforated sheet-metal filtering element C, which is made of somewhat-greater diameter than the grooved area and than the screen B, so that it lodges upon the top of the shoulder $A^4$, extending thus beyond the periphery of the woven-wire screen. The woven-wire screen may be secured to the grooved plate by staples at as many points as may be found convenient or desirable and the perforated plate C may be secured by tacks driven through it into the plank A around the margin. The plate A has a central aperture $A'$, bounded by a shoulder $A^5$, corresponding to the shoulder $A^4$ about the periphery of the plate, and the woven-wire screen is formed with a central aperture adapting it to lodge inside the shoulder $A^5$, on which also the inner margin of the plate C, which is also centrally apertured, is lodged and secured in the same manner as it is secured at the outer edge.

D is the annular wall of the cell, interposed between consecutive plates and making at its edges water-tight junction with the surface of the plank A just outside of the periphery of the metal surface covering C. It will be understood that the press is made up of a large number of cells bounded between two filter-plates and by the annular cell-wall D. Longitudinal strain-rods E are employed to bind the entire number of plates constituting the press firmly together against intermediate cell-walls.

*a a*, &c., are posts which are secured to the plates at a suitable number of points, preferably distributed about the center and somewhat nearer the center than the periphery, such posts being arranged to abut end to end and transmit the strain of the pressure which forces the material to be filtered through the element. If, in any instance, the accumulated contents of adjacent cells is of different character or density, the excess of pressure upon one side might tend to bend the plate and ultimately to break it. This feature is common in presses of this class.

For the perforated plate C, I prefer long narrow slots *c c*, &c., as shown in Fig. 3 of the drawings. These plates are made of brass or some equally-soft metal, the perforations or slots being made by punching. This mode of perforation leaves the margins of the slots at one surface of the plate smooth and slightly rounded or sunken, the other surface having around the margins of the slots fine burs or ragged edges resultant from the emergence of the punch at that side. The metal being comparatively soft is also affected by the stroke of the punch in such a way that the aperture is slightly greater in width at the entering side than at the emerging side of the punch, because the metal is apparently slightly stretched down into the die at the emerging side. Now as a matter of fact the value of such a perforated plate as a filtering element lies not so much in the absolute fineness of the apertures—that is to say, it does not depend upon the apertures being fine enough to exclude or hold back all the solid matter which it is desired or expected to retain; but it operates as a filtering element by causing the retention upon the entering side of the larger solid particles which accumulate across the narrow apertures, bridging them and causing a film or web over them which itself becomes a means of filtering the subsequent liquid, holding back finer and finer particles until there is accumulated upon the plate a film sufficiently thick and close to permit only water to pass. This operation is greatly facilitated by the rough edges or burs upon one side of the plate when that side is turned toward the substance to be filtered and is made the entering side. Furthermore, if the plate were placed the other side out, the apertures being wider at that side, the finer particles would enter such apertures and become wedged tight in them, and they would eventually and very quickly in practice become so thoroughly clogged that no material could pass through. For both these reasons the plate operates with very much better results when placed with the burred side toward the substance to be filtered—*i. e.*, at the entering side—the opposite side where the apertures are wider being the delivery side, thus permitting a very free delivery of anything that passes the narrower entrance of the slots.

Very considerable advantage is gained by employing for the filtering element sheet metal having long slots instead of mere circular perforations and placing such metal sheet with its slots extending up and down in preference to horizontally. When thus formed and placed, any particles which may become engaged in the slots are likely to be disengaged by the flow of the water through the slots by reason of the length and vertical direction of the slots, and, in fact, the perforated sheet metal, even if the perforations are thus elongated, is very liable to become clogged if the perforations extend horizontally instead of vertically, because of the loss of the flushing effect of the water passing through the slots and following longitudinally along the same.

I claim—

1. A filtering-plate for a filter-press, comprising a back or central element superficially channeled or grooved; an open-meshed wire screen applied on the grooved surface of said back element; a perforated sheet-metal plate applied on the screen; and suitable means for binding said elements together.

2. A filtering-plate for a filter-press, comprising a back or central element superficially channeled or grooved; an open-meshed wire screen applied upon the grooved surface; a sheet-metal plate having perforations in the form of long, narrow slots, applied upon the wire screen; and suitable means for binding said elements together.

3. A filtering-plate for a filter-press, comprising a back or central element superficially grooved; an open-meshed wire screen applied upon the grooved surface; a sheet-metal plate perforated with fine slots whose margins are burred or roughened, such plates being applied upon the woven-wire screen with its burred or roughened surface outward.

4. A filtering-plate for a filter-press, comprising a back or central element having vertical parallel channels or grooves and suitable means for draining the same; an open-meshed wire screen applied upon the grooved surface with its wires in both directions oblique to the vertical grooves; a sheet-metal plate perforated with long fine slots applied upon the open-meshed screen; and suitable means for securing said several elements together.

5. A filtering-plate for a filtering-press, comprising a back or central element having up-and-down drainage-channels; an open-meshed wire-screen applied upon such central element and its surface covering constituting the filtering element, consisting of sheet metal perforated with long, fine slots, and applied with its slots extending up and down.

In testimony whereof I have hereunto set my hand at Chicago, Illinois, in the presence of two witnesses, this 14th day of March, A. D. 1900.

JOHN E. TURNEY.

In presence of—
  CHAS. S. BURTON,
  ADNA H. BOWEN, Jr.